United States Patent
Dos Santos et al.

(10) Patent No.: US 10,533,633 B2
(45) Date of Patent: Jan. 14, 2020

(54) ROLLER CHAIN INNER PLATE

(71) Applicant: SRAM, LLC, Chicago, IL (US)

(72) Inventors: Pedro Miguel Nunes Dos Santos, Coimbra (PT); Bruno Miguel Ferreira Da Silva Ribeiro, Aveiro (PT)

(73) Assignee: SRAM Deutschland, GMBH, Schweinfurt (DE)

( * ) Notice: Subject to any disclaimer, the term of this patent is extended or adjusted under 35 U.S.C. 154(b) by 203 days.

(21) Appl. No.: 15/259,350

(22) Filed: Sep. 8, 2016

(65) Prior Publication Data

US 2017/0067536 A1   Mar. 9, 2017

(30) Foreign Application Priority Data

Sep. 9, 2015 (DE) .......... 10 2015 011 500
Aug. 12, 2016 (DE) .......... 10 2016 009 814

(51) Int. Cl.
  *F16G 13/06*   (2006.01)
(52) U.S. Cl.
  CPC .................. *F16G 13/06* (2013.01)
(58) Field of Classification Search
  CPC ... F16G 13/06; B62M 9/00; B62M 2009/005; B62M 9/06; B62M 9/10
  USPC .................................. 474/206, 231
  See application file for complete search history.

(56) References Cited

U.S. PATENT DOCUMENTS

| | | | | |
|---|---|---|---|---|
| 1,551,764 A | * | 9/1925 | Muller | C21D 9/0087 148/211 |
| 3,359,815 A | * | 12/1967 | Mueller | B21L 15/005 474/231 |
| 3,595,011 A | * | 7/1971 | Nicholson | F16G 13/07 59/8 |
| 4,265,134 A | * | 5/1981 | Dupoyet | F16G 13/06 474/231 |
| 4,642,078 A | * | 2/1987 | Dupoyet | F16G 13/06 474/206 |
| 4,983,147 A | * | 1/1991 | Wu | F16G 13/06 474/206 |
| 5,066,265 A | * | 11/1991 | Wu | F16G 13/06 474/206 |
| 5,073,153 A | * | 12/1991 | Wu | F16G 13/06 474/206 |
| 5,098,349 A | * | 3/1992 | Wu | F16G 13/06 474/206 |
| 5,226,857 A | * | 7/1993 | Ono | F16G 13/06 474/231 |
| 5,437,577 A | * | 8/1995 | Wu | B62M 9/00 474/218 |
| 5,741,196 A | * | 4/1998 | Campagnolo | B62M 9/10 474/206 |

(Continued)

FOREIGN PATENT DOCUMENTS

CN   201155544 Y   11/2008
DE     2829424      2/1979

(Continued)

*Primary Examiner* — Henry Y Liu

(57) ABSTRACT

A bicycle chain is used to transmit the drive force to at least one chain wheel and contains chain rollers and inner and outer plates which are connected to each other by means of pins. As a result of a corresponding shaping of the extremely hard inner plate, the wear on the teeth which cooperate with the inner plate can be reduced on the chain wheels or sprockets.

11 Claims, 13 Drawing Sheets

(56) References Cited

U.S. PATENT DOCUMENTS

| | | | | |
|---|---|---|---|---|
| 5,799,479 | A * | 9/1998 | Tanaka | F16G 13/06 474/206 |
| 5,803,853 | A * | 9/1998 | Wu | B62M 3/00 474/160 |
| 6,110,064 | A * | 8/2000 | Guichard | F16G 13/06 474/230 |
| 7,267,220 | B2 * | 9/2007 | Wang | F16G 13/06 198/850 |
| 7,325,391 | B1 * | 2/2008 | Oishi | F16G 13/06 474/206 |
| 7,473,198 | B2 * | 1/2009 | Kamada | F16G 13/06 474/230 |
| 7,837,584 | B2 * | 11/2010 | Wu | F16G 13/06 474/218 |
| 7,946,941 | B2 * | 5/2011 | Oishi | F16G 13/06 474/206 |
| 8,734,280 | B2 * | 5/2014 | Oishi | F16G 13/06 474/230 |
| 9,255,624 | B2 * | 2/2016 | Fukumori | F16G 13/06 |
| 9,303,725 | B2 * | 4/2016 | Fukumori | B62M 9/00 |
| 9,303,726 | B2 * | 4/2016 | Fukumori | B62M 9/00 |
| 9,528,588 | B2 * | 12/2016 | Reiter | B62M 9/10 |
| 9,541,159 | B2 * | 1/2017 | Wang | F16G 13/06 |
| 9,939,045 | B2 * | 4/2018 | Fukumori | F16G 13/06 |
| 2005/0020394 | A1 * | 1/2005 | Valle | B62M 9/00 474/155 |
| 2005/0164816 | A1 * | 7/2005 | Wang | F16G 13/06 474/234 |
| 2005/0202914 | A1 * | 9/2005 | Reiter | F16G 13/06 474/206 |
| 2006/0014600 | A1 * | 1/2006 | Wu | F16G 13/06 474/206 |
| 2012/0322599 | A1 * | 12/2012 | Oishi | F16G 13/06 474/230 |

FOREIGN PATENT DOCUMENTS

| | | |
|---|---|---|
| DE | 19705018 | 9/1997 |
| DE | 20212596 | 2/2003 |
| DE | 202010008814 | 12/2010 |
| DE | 202010008814 U1 | 12/2010 |
| DE | 102014215928 | 4/2015 |
| DE | 102014215960 | 4/2015 |
| DE | 102014215963 | 4/2015 |
| EP | 1522490 | 4/2005 |
| EP | 2535616 | 12/2012 |

* cited by examiner

ROLLER CHAIN INNER PLATE

This application claims priority to, and/or the benefit of, German patent application DE 10 2015 011 500.6, filed on Sep. 9, 2015, and German patent application DE 10 2016 009 814.7, filed on Aug. 12, 2016.

FIELD OF THE INVENTION

The present invention relates generally to a drive chain for bicycles with improved wear behavior, and specifically to a drive chain that cooperates with multiple sprockets on a rear wheel.

BACKGROUND

Drive chains for bicycles with a derailleur system are composed of chain links which are arranged so as to be able to he pivoted with respect to each other and by means of which a closed chain loop is formed for drive force transmission. These chain links can be rotated relative to each other about chain pins, wherein the chain pins are received by holes which are located centrally in the two round end regions of each chain plate. The two end regions of each chain plate are connected to each other by means of a connection region with an outer contour which is in most cases constructed in a tapered manner. The chain links have either a pair of inner plates or a pair of outer plates. The inner plates have at their inner side collars, wherein a chain roller is rotatably arranged on a pair of collars which are arranged in a mirror-symmetrical manner relative to each other, respectively. The teeth of the chain wheels can engage in the intermediate spaces between the plate pairs.

This engagement operation takes place both in the case of a driving operation, in which the chain moves into engagement with teeth on a single chain wheel, and when the chain is displaced when switching from one chain wheel to the adjacent chain wheel. In order to carry out these engagement functions, it is desirable to construct the intermediate spaces between the plate pairs to be as large as possible in the direction perpendicular to the inner side of the plates. On the inner plates which are located more closely relative to each other, chamfers help to form an introduction funnel-like member for the teeth of the chain wheel being introduced into the intermediate spaces.

In the development of derailleur systems for bicycles which comprise a front chain wheel, roller chain, multiple rear sprockets and associated shifting devices, the number of sprockets on the multiple sprocket arrangement has continuously increased in a gradual manner. This has involved changes of the dimensions of sprockets, chain plates, chain pins and chain rollers, primarily the dimensions in the direction parallel to the longitudinal axis of the chain pins. Consequently, the chain is adapted to the rear sprockets which are positioned on the rear wheel hub with increasingly small axial spacing with respect to each other. In this instance, it is clear that the components of the chain which protrude in an axial direction beyond the outer side of the chain are also obstructive since they can come into contact with components of the adjacent sprocket in an undesirable and disruptive manner.

A reduction of the dimensions of the components of the chain leads in this instance to an increase of the loads for the chain, for example, the surface pressure on the chain pins which have become shorter. This results in an increase of the wear which is counteracted, for example, with the use of harder materials or by the provision of a more wear-resistant surface coating or by means of hardening of the surface.

The single-sided increase of the surface hardness of the chain components in the chain/chain wheel system at the side of the chain alone leads in this instance to a more rapid wear at the side of the chain wheels or the sprockets.

EP 1 522 490 A2 sets out chamfers in the direction towards the outer contour of the plates which arc intended to reduce the generation of noise when the sprocket teeth leave the intermediate plate spaces. It is described that noise is produced when the tooth tip or an edge on the tooth tip slides over edges on the outer contour of the chain plates. This sliding takes place when the chain plate and sprocket tooth move out of engagement during normal driving operation without any gear change with the chain which extends in an oblique manner away from the multiple sprocket assembly and also during gear change operation when the change portion of the chain which extends from one chain wheel to the adjacent chain wheel moves in a radially outward direction away from the tooth arrangement. This takes place when the change portion of the chain is moved in from the rear sprocket into the tensioned strand of the chain and when the change portion of the chain is moved from the front chain wheel into the slack strand of the chain.

This approach for reducing noise has also been implemented in the structural solutions which are set out in DE 10 2014 215 928 and in DE 10 2014 215 960.

The patent application U.S. Pat. No. 4,642,078 sets out a drive chain which is constructed in a particularly narrow manner and which is suitable for a multiple sprocket assembly on a rear wheel hub with a high number of gears. The drive chain set out has protruding inner plates and planar outer plates.

The inner side of the connection region of the inner plates has in comparison with the contact face between the chain roller and inner side of the inner plate an offset in outward direction which, when the material thickness of the inner plate is retained, also appears on the outer side on the connection region of the inner plates. Starting from the outer contour of the connection region of the inner plates, there is an outward protuberance which forms a funnel-like opening for the introduction of the teeth of the sprocket or chain wheel. The clear width between the plates of the inner plate pair is on the whole increased by the offset mentioned. Consequently, favorable conditions have been provided for the introduction of a tooth into the inner plate intermediate space.

In EP 2 535 616 the solution from U.S. Pat. No. 4,642,078 has been developed by the outer side on the connection region of the inner plate being constructed in a planar manner. There is consequently produced at the connection region of the inner plate a smaller material thickness in comparison with the round end regions of the inner plate. A reduced material thickness at the connection region of the inner plate has also already been implemented in DE 197 05 018.

With multiple sprocket assemblies having a further increased the number of sprockets, it is consequently necessary to take measures to obtain or achieve a reliable engagement of the sprocket teeth in the intermediate space between a pair of inner plates. These measures include the reduction of the dimensions, for example, a shortening of the length of chain pins and chain rollers which leads to an increase of the component loads and to increased wear.

SUMMARY AND DESCRIPTION

In an embodiment, a chain inner plate for a roller chain has an inner side, an outer side, two ends having, annular regions, each annular region having a round outer contour, a connection region, which connects the two annular regions, and two collars, of which one collar is arranged at the inner side directly adjacent to each of the two annular regions. The connection region of the inner side has a recess having an inner side material thickness and the inner side material thickness is smaller than an annular region material thickness of the annular regions. A surface of the recess comprises a first curved part-face, wherein a part-face may be a sliding surface, which adjoins a planar part-face, or a second curved part-face having at least one tangential transition when viewed in cross-section.

In an embodiment, a roller chain for a bicycle contains outer plates, chain pins, chain rollers and chain inner plates. At least one chain inner plate has an inner side and an outer side, two ends having annular regions which each have a round outer contour, a connection region, which connects two annular regions, and two collars, of which one collar is arranged at the inner side directly adjacent to each of the two annular regions. The connection region of the inner side has a recess having an inner side material thickness, which is smaller than an annular region material thickness of the annular regions. A surface of the recess has a first curved part-face which adjoins a planar part-face; or a second curved part-face having at least one tangential transition when viewed, in cross-section.

In an embodiment, a chain inner plate for a roller chain has an inner plate inner side and an inner plate outer side, two ends having two annular regions which each have a round outer contour, and a hole which is substantially concentric with respect to the outer contour, a connection region, which connects the two annular regions, and two collars, of which in each case one collar is arranged at the inner side directly adjacent to in each case one of the two annular regions. An inner plate catch chamfer is provided between the round outer contour of the annular region and the annular region on the inner plate inner side, and wherein the inner plate catch chamfer encloses a chamfer angle of less than forty-five (45) degrees with the inner plate inner side of the annular region.

DETAILED DESCRIPTION OF THE DRAWINGS

Figure 1:
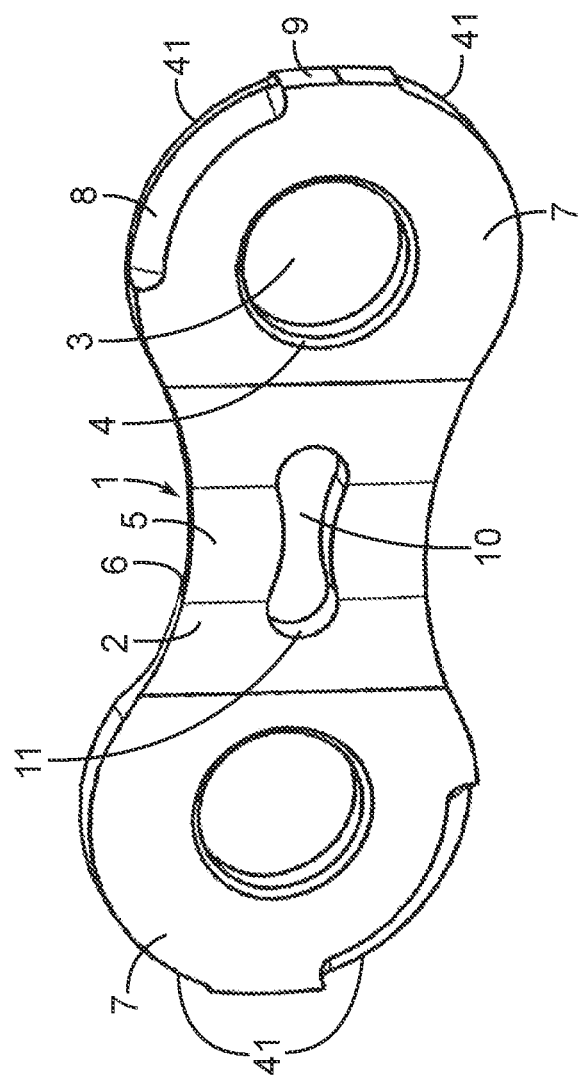
FIG. 1 shows the outer side of an outer plate.

A roller chain is provided for multiple sprocket assemblies having an increased number of sprockets. The roller chain provides a reliable engagement of the sprocket teeth in the intermediate space between a pair of inner plates and furthermore to keep the anticipated higher level of wear within limits. In an embodiment, it is possible for no components of the ends of the chain pins to protrude beyond the outer side of the outer plates and to provide starting points for an undesirable contact between the pin end and the sprocket tooth on the adjacent sprocket.

An engagement of the sprocket teeth into the intermediate space between a pair of inner plates takes place in the case of the outer plate chain links, in which a pair of outer plates produces the connection between chain pins which are adjacent in the chain longitudinal direction. There, the inner plates, which protrude beyond the chain rollers, interact with the sprocket teeth, albeit only when the respective sprocket tooth has already moved with its outer contour radially far into the intermediate space between the chain links and has moved into the vicinity of the corresponding chain roller.

Here, contact occurs between the inner plates and sprocket tooth. Said contact inevitably leads to wear, primarily of the sprocket tooth, the material of which is generally softer than the material of the chain plates.

Said wear increases if the chain running onto or off the sprocket assumes a greater angle of obliquity in relation to the plane of the chain wheel.

The bevels and chamfers on the inner plates of the chain plates are provided in order that the sprocket tooth and chain enter into engagement in an effective manner; said bevels and chamfers form funnel-like "passages" on the chain for the entry and exit of the tooth tips.

Said "passages" are effective both when the chain is displaced from the relatively small sprocket to the relatively large sprocket and when the chain is displaced from the relatively large sprocket to the relatively small sprocket. The structural design of said passages plays a major role with regard to wear.

In an embodiment, the bevels and chamfers go far beyond that which is known as a chamfer at an angle of forty-five (45) degrees for breaking up a sharp edge on a solid part or on a sheet-metal part such as a chain plate.

For a changeover of the chain from the relatively small sprocket to the relatively large sprocket for the purposes of changing gear, radially inclined bevels are provided on the teeth on the relatively large sprocket, by way of the action of which bevels the chain repeatedly slides on said teeth of the rotating, relatively large sprocket and cannot be displaced axially toward the relatively large sprocket. Said bevels are thus a reliable feature for switching assistance in order to prevent a displacement, which is undesired at certain circumferential positions, of the chain links in a direction parallel to the axis of rotation of the sprocket toward the relatively large sprocket.

In the event of a changeover from the relatively large sprocket to the relatively small sprocket, such a reliable feature for switching assistance does not exist. Rather, the chain links can pass out of engagement at any circumferential position on the relatively large sprocket if, during a switching process, the diverting forces imparted by the rear chain switching mechanism are merely great enough.

Thus, further starting points for a further development of the roller chains for bicycles emerge from the ever-increasing demands with regard to the switching from a relatively large sprocket to a relatively small sprocket at the rear wheel of the bicycle. In particular, it is sought here to make it possible for said switch to be performed in controlled fashion only at certain circumferential positions on the relatively large sprocket at which the changing-over chain can, at the relatively small sprocket, too, immediately engage into the sprocket teeth without first running over the tooth tips on the relatively small sprocket.

For this purpose, on selected teeth on the relatively large sprocket, bevels which may be inclined in the circumferential direction are provided in order to permit a passage of an inner plate link laterally past said tooth, as presented in DE 4330989.

As a further means for avoiding a tendency of disengagement of the chain from the relatively large sprocket, it has proven to be effective for the sprocket teeth to be formed with a greater thickness, which almost completely fill the intermediate space between a pair of inner plates. Thus, the possibility of the chain links being displaced transversely with respect to the sprocket teeth in a direction parallel to the axis of the chain pin is reduced. Said measure is supplemented by the use of a chain in which the inner plates protrude in relation to the chain rollers. Said aspect is discussed in EP 2 141 069.

Altogether, said chamfers on the inner sides of the chain plates, on which in the case of modern chains there is also situated a collar as a bearing base for the chain roller, have to satisfy mutually contradictory conditions.

Firstly, the height of the chamfer extending in a radial direction should be small in order that the inner side, protruding beyond the chain roller, of the inner plate is available up to as great as possible a radial height for the guidance between sprocket tooth and chain inner plate. This yields a demand for a large chamfer angle between the chamfer and the plane formed by the inner plate inner side.

Secondly, the chamfer should form a small chamfer angle in order that the wear remains low. According to the invention, a chamfer angle has been selected which yields a low level of wear.

FIGS. 1 to 6 show details of a known chain which show the environment for the use of the inner plate or which are also used with the inner plate for a roller chain.

FIG. 1 shows the outer plate outer side 5 of an outer plate 1 with a connection region 2 and two annular regions 7. The connection region 2 optionally protrudes outwards. In order to receive the chain pins 18 which are not illustrated, each annular region 7 has a hole 3 which is provided in each case with a pin end embossing 4. Each of the pin end embossings 4 has an outwardly funnel-shaped expansion in which a thickened pin end which is not shown can be received in a positive-locking manner.

The contour of the outer plate 1 is rounded and is formed by concave edge portions 6 on the connection region 2 and convex edge portions 41 on the annular regions 7. The convex edge portions 41 are provided in FIG. 1 at the top right and bottom left with an outer plate deflection chamfer 8, respectively, which extend over an angular range of approximately ninety degrees (90°) and terminate upstream a the plate ends 9. In the connection region 2 there is located for weight reduction an opening 10 with rounded edges 11 which is provided in the chain according to an embodiment.

Figure 2:
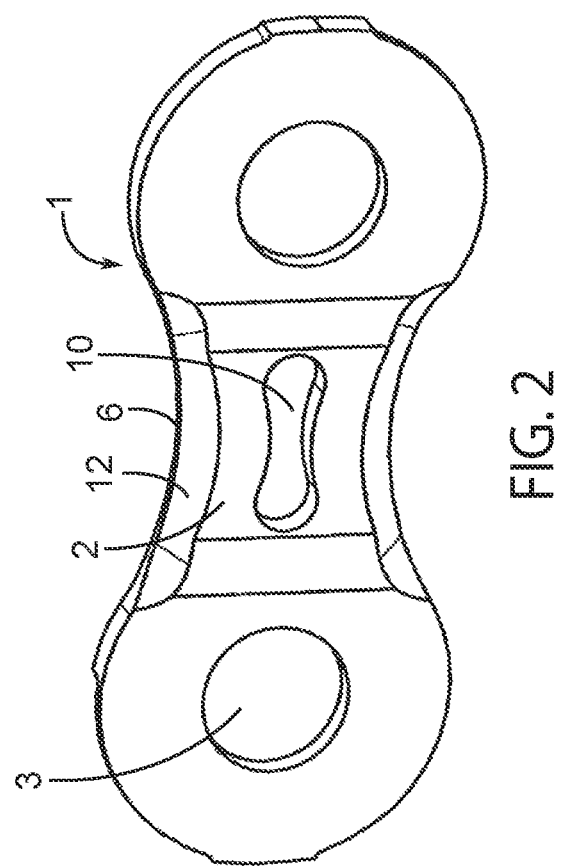
FIG. 2 shows the inner side of an outer plate.

FIG. 2 shows the inner side of an outer plate 1 with the holes 3 and with the optional opening 10. The concave edge portions 6 are in each case provided with an outer plate catch chamfer 12 which extends in the longitudinal direction over the connection region 2.

Figure 3:
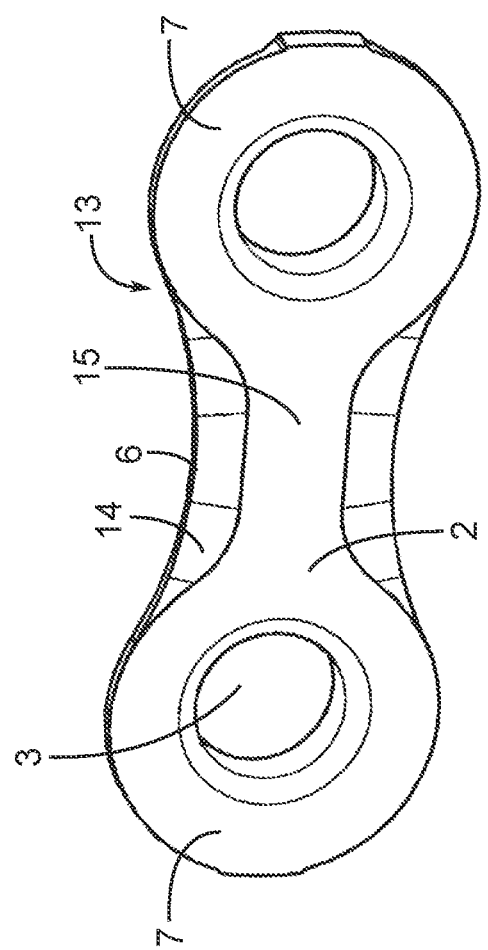
FIG. 3 shows the outer side of an inner plate.

FIG. 3 shows the inner plate outer side 15 with two holes 3 for receiving chain pins 18 which are not illustrated. The concave edge portions 6 on the connection portion 2 are provided with relatively wide optional inner plate deflection chamfers 14. The convex edge portions 41 are not chamfered.

Figure 4:
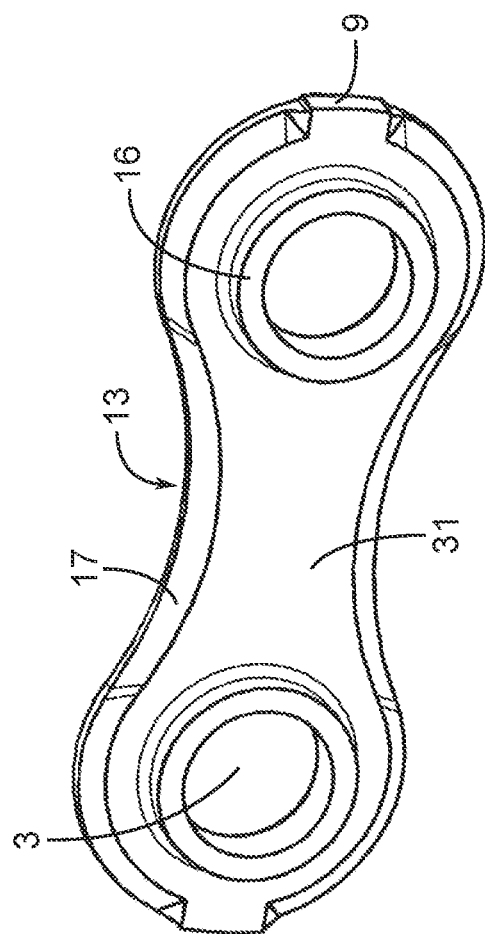
FIG. 4 shows the inner side of an inner plate.

FIG. 4 shows the inner plate inner side 31 of an inner plate 13 with the two holes 3. These holes 3 are each chamfered with tubular collars 16 for receiving the chain rollers 20 which are not shown. The concave edge portions 6 and convex edge portions 41 have with the exception of the plate end 9 a peripheral inner plate catch chamfer 17.

Figure 5:
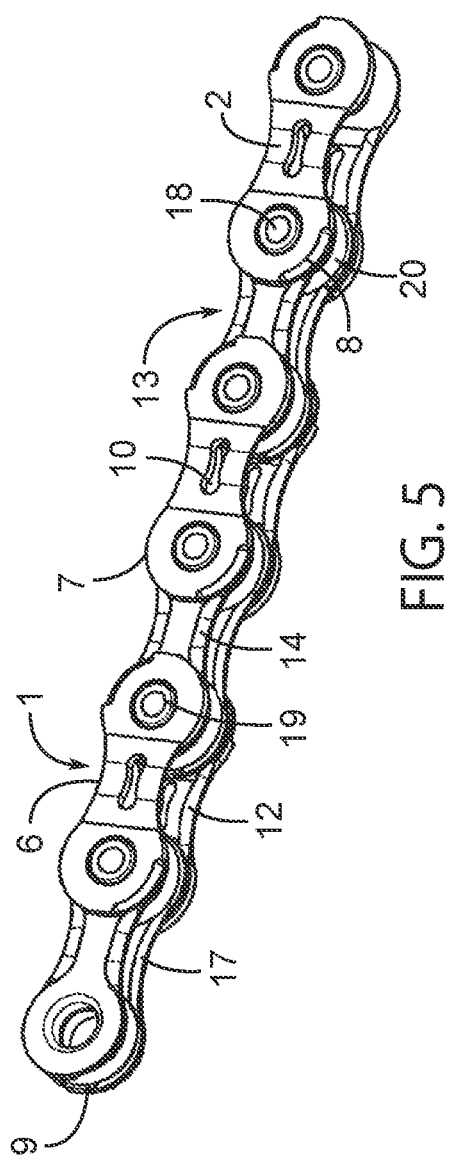
FIG. 5 shows a chain portion with inner and outer plates.

FIG. 5 shows a chain portion with the outer plates 1 and the inner plates 13. The chain plates are connected to each other in an articulated manner by means of chain pins 18. The pin ends 19 of the chain pins 18 do not protrude in an axial direction beyond the pin end embossings 4 of the outer plates 1. The outer plates 1 have on the inner sides in the connection region 2 outer plate catch chamfers 12 and on the outer sides outer plate deflection chamfers 8. A chain roller 20 is associated with each chain pin 18.

The inner plate deflection chamfers 14 ensure that, when the chain is displaced onto an adjacent chain wheel, both inner plates laterally pass a tooth and do not mount the tooth.

The inner plate catch chamfers 17 on the inner sides of the inner plates serve to form a funnel shape of the largest possible clear width for the engaging teeth. The construction of these inner plate catch chamfers 17 is an important component of the inner plates 13.

Figure 6:
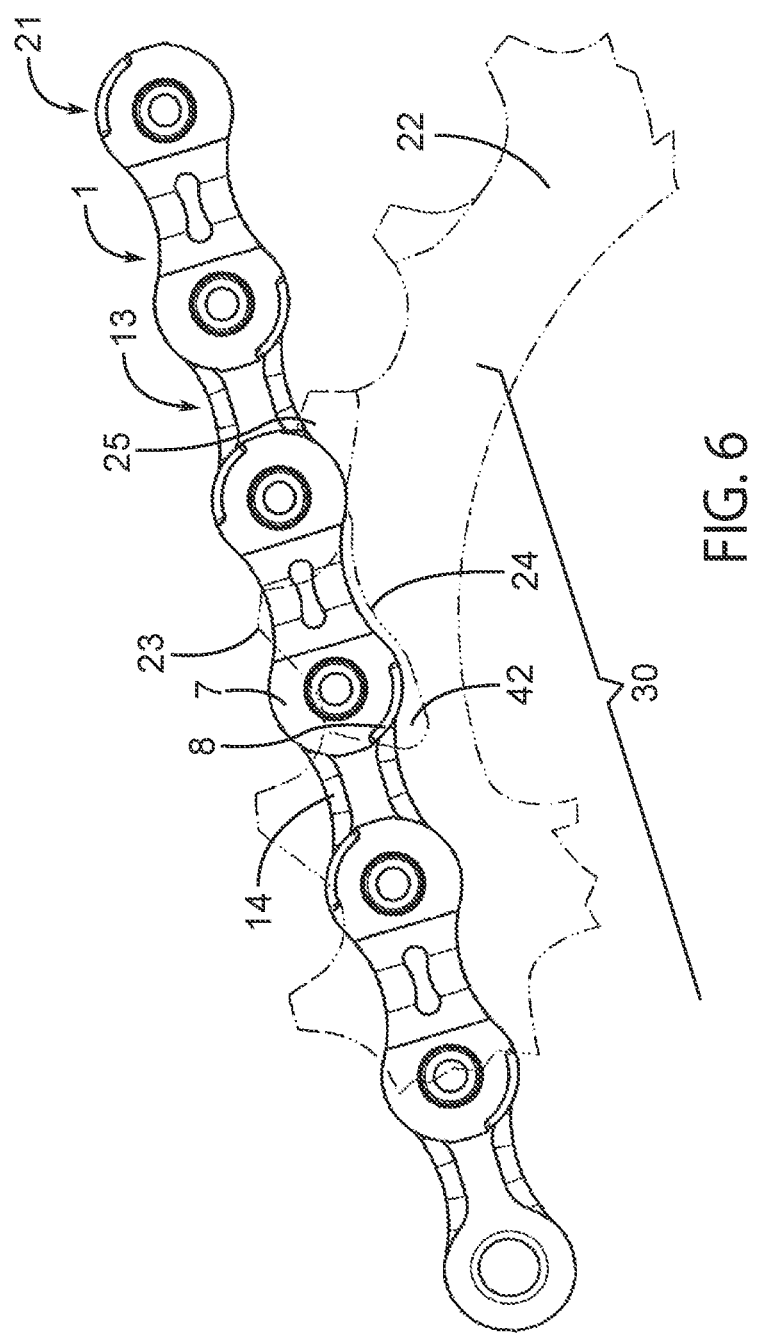
FIG. 6 shows a cut-out of a chain and chain wheel during the switching operation.

FIG. 6 shows a portion of the chain 21 and of a larger chain wheel 22 during the switching operation from the smaller chain wheel, which is not illustrated, towards the larger chain wheel 22 which rotates in a counterclockwise direction. The chain change portion 30 extends tangentially away from the smaller chain wheel in the direction towards the larger chain wheel 22.

The chain 21 is illustrated as an outer view. The larger chain wheel 22 which is schematically illustrated with dot-dash lines may be a front chain wheel on a crankset or a rear sprocket on the rear wheel.

If the larger chain wheel is a front chain wheel on a crankset, the chain 21 faces the viewer, and the larger chain wheel 22 is located therebehind.

If the larger chain wheel is a rear sprocket on the rear wheel, the larger chain wheel 22 faces the viewer and the chain 21 is located therebehind.

A deflection tooth 23 with an embossing 42 and a catch tooth 25 can be seen on the larger chain wheel 22.

This view illustrates the function of the outer plate deflection chamfer 8 when the chain 21 and rear multiple sprocket assembly cooperate and shows how the outer plate 1 when switching towards the larger chain wheel 22 can slide along the flank of the laterally recessed deflection tooth 23 in the direction of an embossing edge 24. The outer plate deflection chamfer 8 on the convex edge portion 41 prevents the outer plate 1 from becoming caught with the left lower edge on the laterally non-recessed tooth base. The non-chamfered right lower edge of the outer plate 1 is intended to be supported on the tooth base of the following tooth 25 and in this instance to move the chain 21 to the level of the larger chain wheel 22.

Although the inner plate 13 which is provided with the deflection chamfer 14 is deflected by the following tooth 25, the subsequent outer plate 1 now moves over the next tooth and consequently successfully ends this switching operation.

Figure 7:
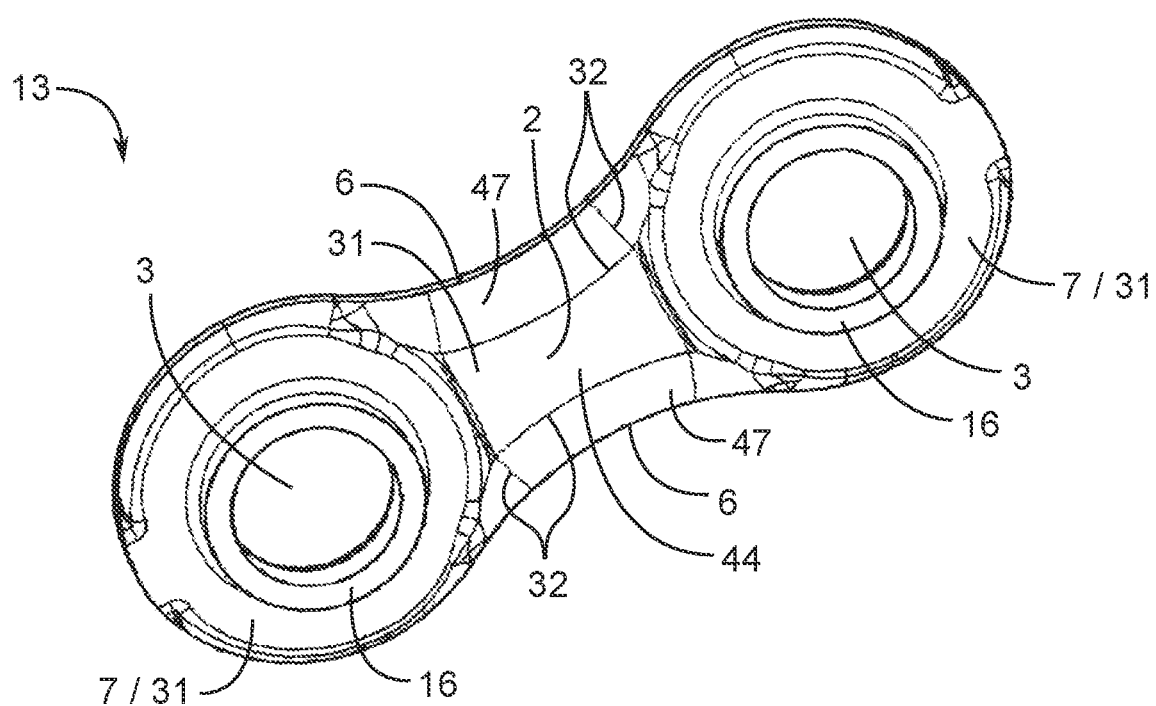
FIG. 7 is a perspective view of an inner plate of a roller chain according to an embodiment when viewed from the inner side of the chain.

FIG. 7 shows an inner plate 13 according to the invention with the two annular regions 7 and the tapered connection region 2 which has two concave edge portions 6. Centrally in the annular regions 7 there are shown holes 3 which are bordered by collars 16. The peripheral cylindrical outer faces of the collars 16 provide the bearing base for the chain rollers 20 which are not illustrated. The outer face 5 (which cannot be seen) of the inner plate 13 is constructed in a planar manner.

The inner plate is produced from a planar starting material. The original material thickness occurs only in a radially outward direction adjacent to the collars 16. In the connection region 2, something is removed from the original material thickness at the inner plate inner side 31.

At the inner plate inner side 31 in the connection region there are a plurality of curved faces which merge into each other. In this instance, a tangential transition between the curved part-faces is particularly advantageous since there are then no edges at the transition locations. When teeth, which are not illustrated, are introduced, edges act like small cutting edges of a small tool with the tendency to remove material components from members which slide over this edge.

The separation lines 32 shown in FIG. 7 represent transitions between adjacent curved surface regions, but not edges.

With previously known inner plates, complex contours on the inner plate were dispensed with. There were selected simple geometric shapes which in the production of shaping tools involved lesser requirements and which could also be verified in a more effective manner in terms of their dimensional accuracy using simple measurement and verification means. These advantages were relinquished in connection with the inner plate 13 according to the invention.

It is also conceivable to modify the described arrangement of completely curved part-faces 44, 47. It would thus be possible for a first part-face 44 which is arranged symmetrically relative to the concave edge portion 6 to also be constructed as a planar face with an almost infinite radius of curvature. In another modification, the second part-faces 47 which directly adjoin the concave edge portion 6 could have in the directions perpendicular to the concave edge portion 6 an almost infinite radius of curvature.

Figure 8:
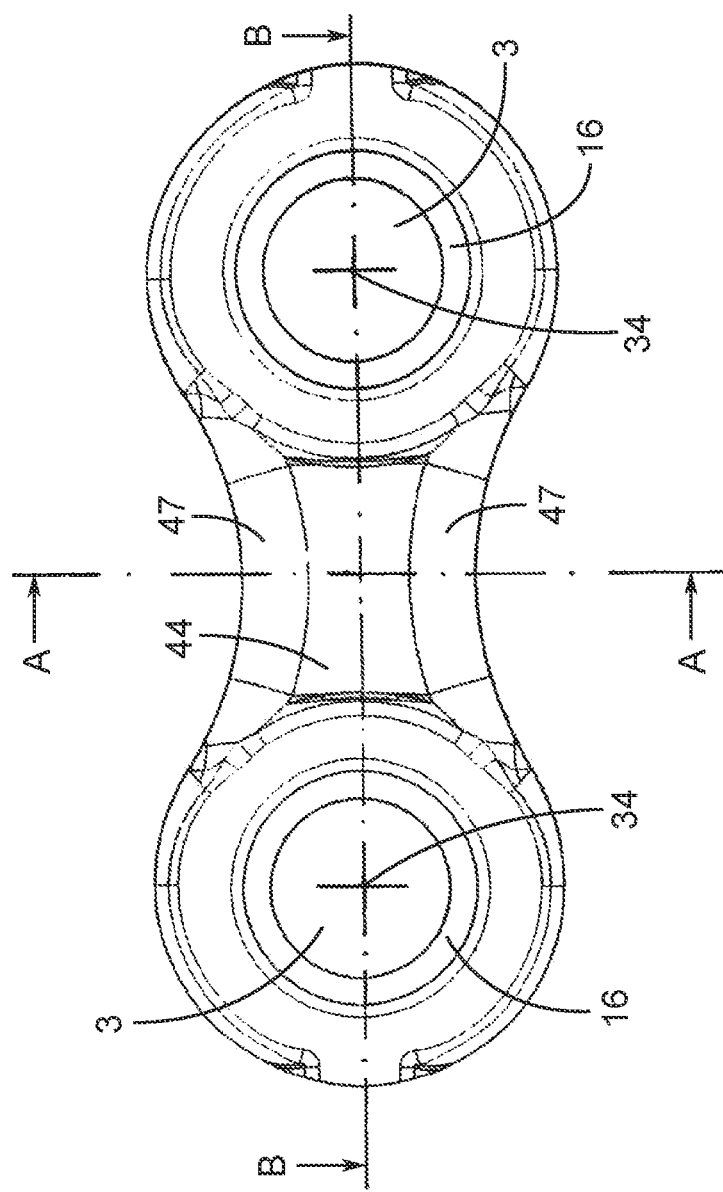
FIG. 8 shows the inner side of an inner plate of a roller chain according to an embodiment when viewed in a direction parallel to the center axes of the holes in the end regions.

FIG. 8 also shows the inner plate according to the invention, when viewed parallel to the axes of the cylindrical inner faces inside the collars.

The section path A-A through the plane of symmetry between the holes 3 and the section path B-B through the center axes 34 of the cylindrical inner faces on the collars 16 can be seen.

Figure 9:
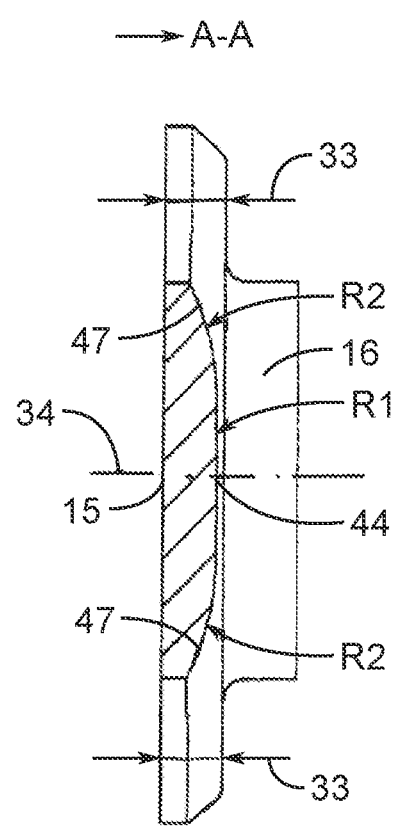
FIG. 9 is a sectioned view with a section in accordance with the line "A-A" in FIG. 8, which extends transversely through the connection region.

FIG. 9 is a sectioned view in the section A-A through the plane of symmetry between the holes 3.

The outer plate outer face 5 which can be seen at the left is planar. The right edging of the sectioned face which is illustrated in the usual shaded manner is curved, wherein a first curved part-face 44 has a larger radius of curvature or a smaller curvature. The edge regions 43 which adjoin it in a tangential transition in an upward direction and in a downward direction have a larger curvature or a smaller radius of curvature.

Figure 10:
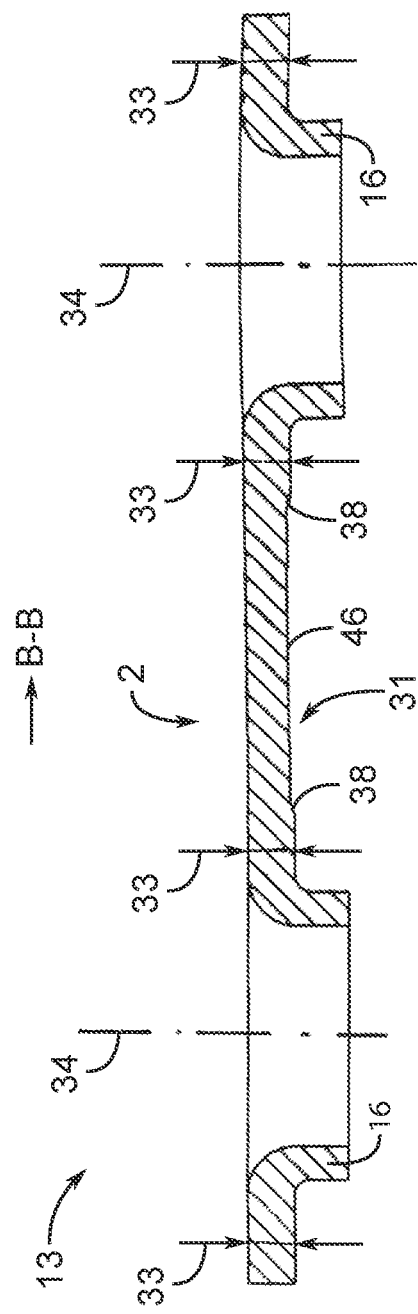
FIG. 10 is a sectioned view with a section in accordance with the line "B-B" in FIG. 8, which corresponds to the plane of symmetry in the longitudinal direction and through which two center axes of the holes extend.

FIG. 10 is a sectioned view with a section B-B through the center axes 34 of the cylindrical inner faces on the collars 16.

It can be seen that in the connection region 2 at the inner side 31 of the inner plate 13 something has been taken away from the original material thickness 33, whereby a recess 46 is produced. That is to say, the surface is recessed and a step 38 is produced.

Figure 11:
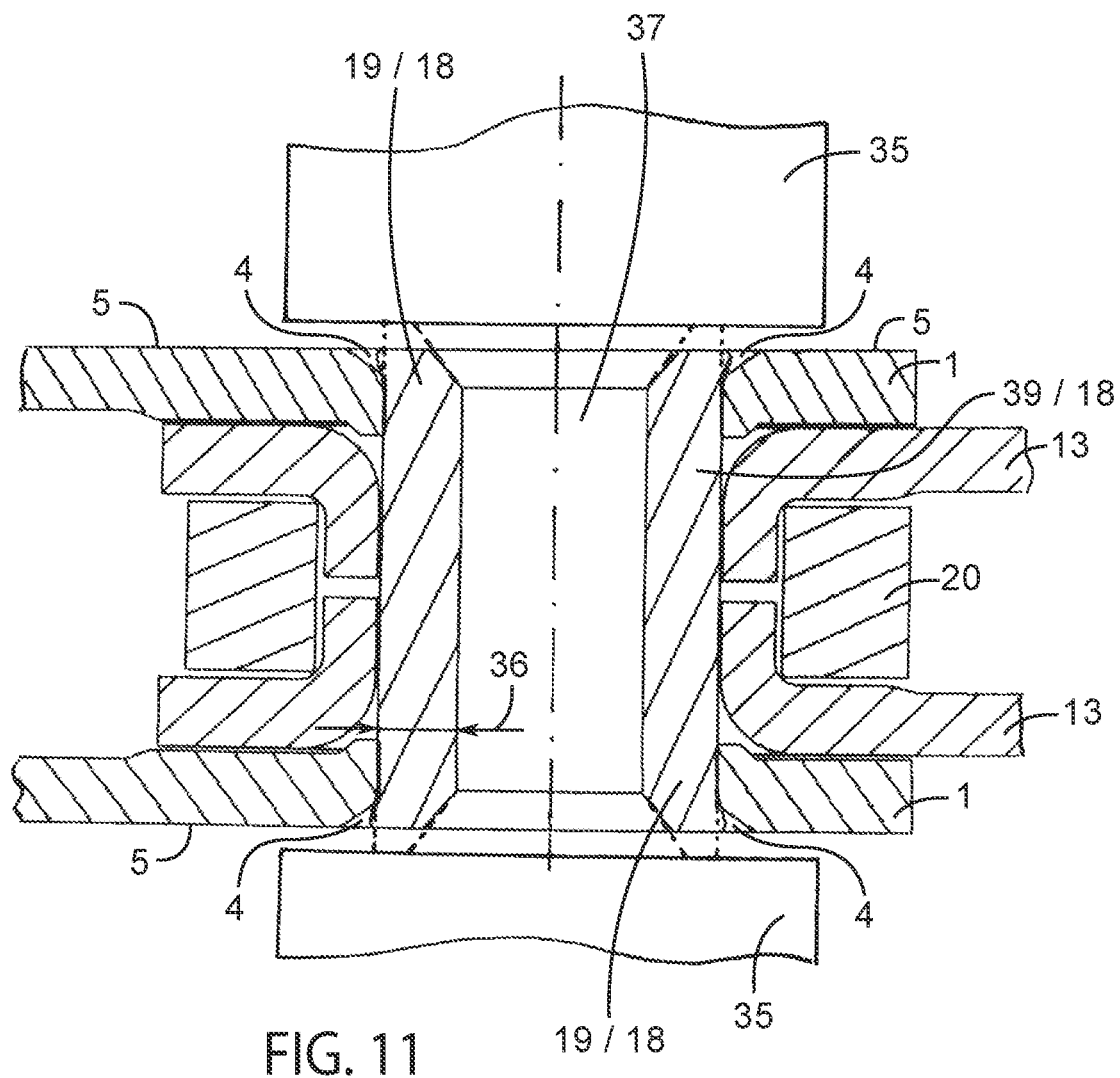
FIG. 11 is a cross-section of an embodiment through the center axis of a chain pin of the roller chain with a continuously hollow pin, and with a comparison of the shape of the pin ends before and after the shaping operation using a planar tool.

FIG. 11 is a cross-section through the center axis of a chain pin of the roller chain according to the invention with a comparison of the shaping of the pin ends 19 before and after the shaping operation using a flat tool 35. In this instance, the dashed line corresponds to the state prior to the shaping operation.

The chain pin 18 is constructed as a hollow pin with a through-hole 37. In the direction towards the pin ends 19, the wall thickness 36 of the hollow pin decreases as a result of a conical expansion of the hole 37, wherein the outer face of the chain pin 18 is a cylindrical face. A center line between the cylindrical outer face of the chain pin 18 on the one hand and the conical expansion of the hole 37 on the other hand is thereby inclined in a radially outward direction with respect to the center axis 34 of the hole in the direction towards the pin end 19, whereby the wall in the sectioned view appears to be tilted.

When a force acts parallel to the center axis 34 of the hole 3 as a result of a flat tool 35 on the pin ends 19, the wall which appears tilted has the tendency to give way radially outwards, accordingly become plastically deformed and forming a peripheral projection as a stop with respect to a movement of the chain pin relative to the outer plate. Sufficient space is provided for the peripheral projection by a chamfer being provided on the outer plate outer side 5 at the outlet of the hole 3 and forming a pin end embossing 4.

A similar behavior is already known in the case of a solid chain pin having tubular pin ends. In this instance, the solid central portion of the chain pin has sufficient rigidity not to become plastically deformed under the action of the planar tool on the pin ends. Accordingly, it is ensured that the chain pins in the solid central portion do not become deformed and ultimately a precisely defined spacing is produced between the outer plates. This spacing is decisive for the lateral movability between the chain links as a result of the play provided between the elements of the chain which are arranged in a row from one pin end to the other pin end, that is to say, the two outer plates, the two inner plates and the chain roller.

In the case of a chain pin 18 with a through-hole 37, the relationships are significantly more complex since the central portion 39 of the pins which adjoins the pin ends 19 already has a tendency to become plastically deformed under the action of a smaller axial force from a tool 35. The difference, which is only small, with respect to the axial force required for the shaping of the tubular pin end 19 on the one hand and the tubular central portion 39 on the other hand acts counter to the reliable adjustment of the lateral movability described.

However, it has been found that when taking into account or including the plastic shortening of the chain pin with a through-hole 37, as occurs under the action of the tools 35, it may be possible to adjust the lateral movability of the chain in accordance with requirements. It is then consequently possible to shape the pin ends by means of planar tools 35 in such a manner that they do not protrude beyond the outer plate outer side 5, which is a requirement with sprockets which are arranged in increasingly tight rows in an axial direction.

In this instance, in alternative methods of the shaping operation by means of a planar tool 35 can be complemented by means of one or more additional process steps in which tools which are constructed in the form of a truncated cone or as a cone are pressed with corresponding force axially into the hole 37. The cone angles may in this instance have a value of a different magnitude.

Figure 12:
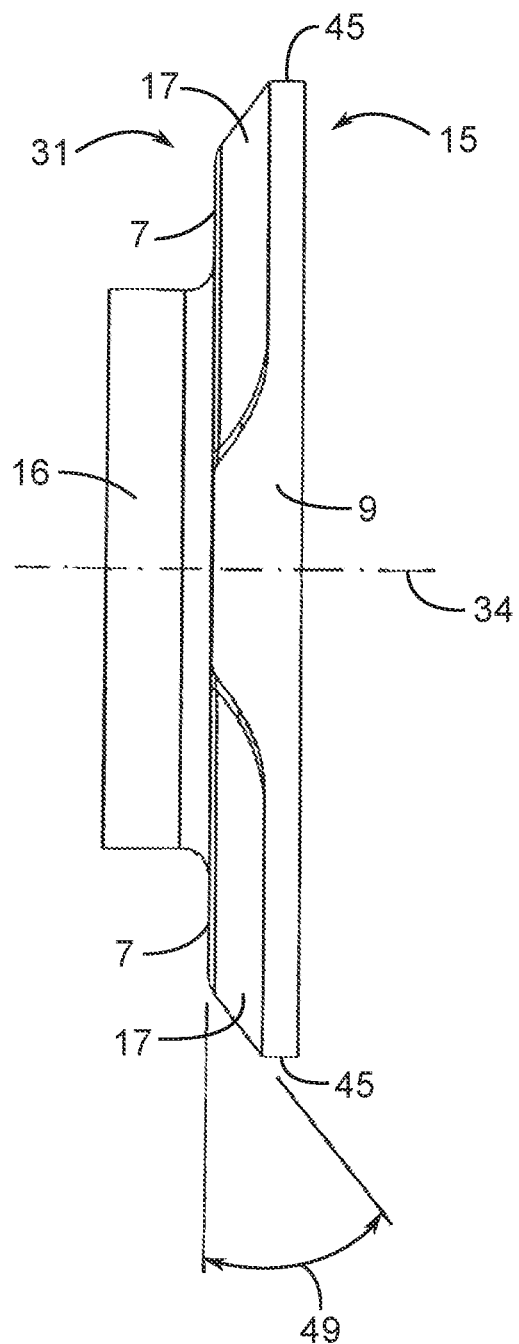
FIG. 12 shows the chamfer according to an embodiment on the inner side of the inner plate, which has a chamfer angle of less than forty-five (45) degrees.
Figure 13:
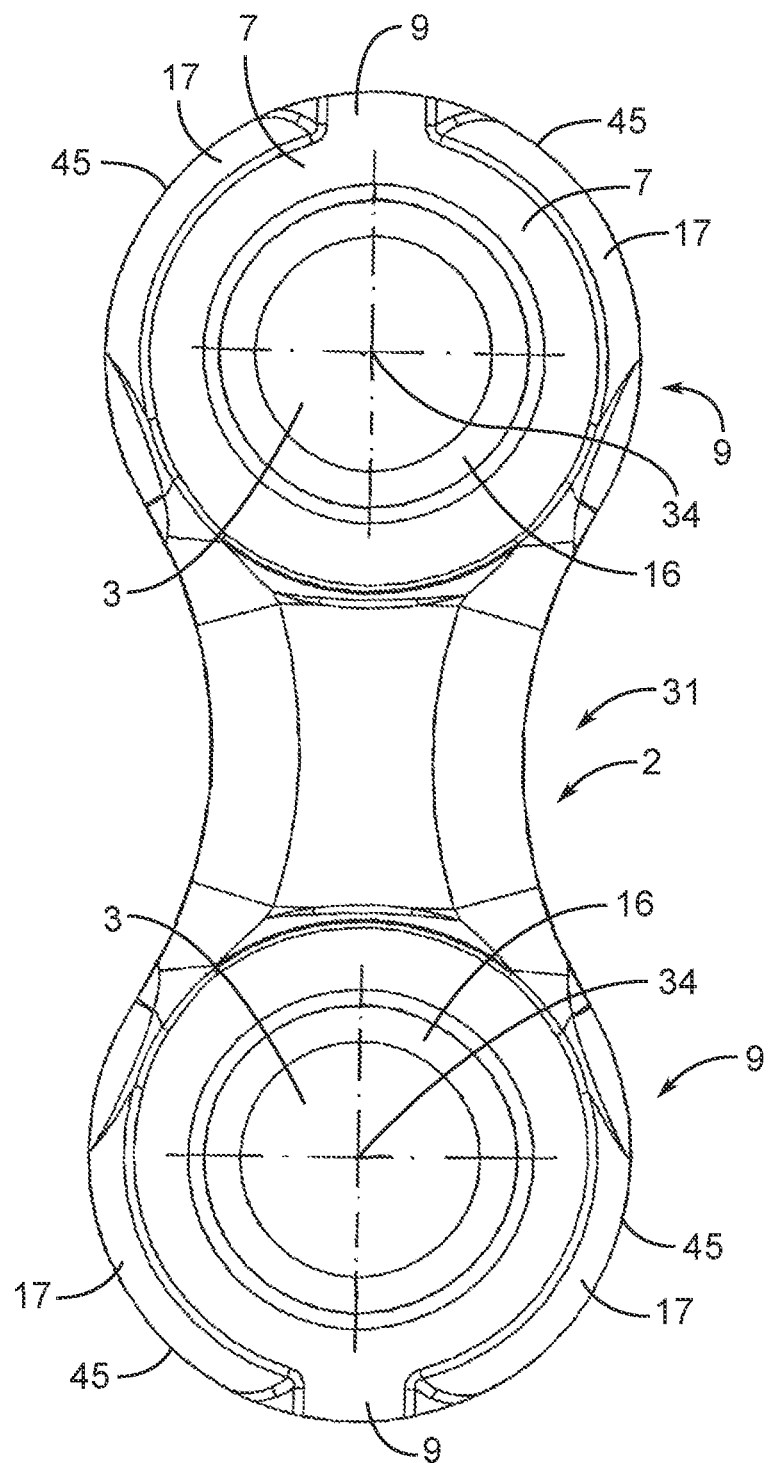
FIG. 13 shows the chamfer on the inner side of the inner plate according to the embodiment of FIG. 12.

FIG. 12 in conjunction with FIG. 13 shows the inner plate catch chamfer 17 on the inner plate inner side 31 in the region of the outer contour 45 of the convex edge portion 41, which has a chamfer angle 49 of less than forty-five (45) degrees between the inner plate catch chamfer 17 and the annular region 7 on the inner plate inner side 31.

A chamfer angle 49 of less than forty-five (45) degrees yields particularly expedient contact forces, and relatively little wear occurs. This applies both to the entry of the tooth into the space between a pair of outer plates and to the process when the sprocket tooth moves out of the plate intermediate space again radially in relation to the axis of rotation of the sprocket.

During the movement of a sprocket tooth out of the space between a pair of outer plates, there is at least still intermittently contact between sprocket tooth and inner plate catch chamfer. With increasing obliquity of the running of the chain as a result of the offset, the tendency for contact to occur between the sprocket tooth and the inner plate catch chamfer 17 increases. Because contact can also be associated with wear, this results in an influence of the obliquity of the running of the chain on the wear on the sprocket tooth.

In an embodiment, a chamfer angle of thirty-eight (38) degrees has proven to be particularly expedient, wherein the outer contour 45 between inner plate catch chamfer 17 and inner plate outer side 15 has an extension in a direction parallel to the center axis 34 of 0.3 millimeters.

The invention claimed is:

1. A chain inner plate for a roller chain, comprising:
an inner side;
an outer side;
two ends having annular regions, each annular region having a round outer contour;
a connection region, which connects the two annular regions; and
two collars, of which one collar is arranged at the inner side directly adjacent to each of the two annular regions;
wherein the connection region of the inner side has a recess having an inner side material thickness, and wherein the inner side material thickness is smaller than an annular region material thickness of the annular regions;
and wherein a surface of the recess comprises a first curved part-face which adjoins a second curved part-face having at least one tangential transition when viewed in cross-section.

2. The chain inner plate for a roller chain of claim 1, wherein the surface at the inner side of the annular regions of the connection region, the surface at an outer side of the annular regions of the connection region, and the surface of the collars are specially hardened.

3. The chain inner plate for a roller chain of claim 1, wherein the surface of the recess has a first curved part-face which has a larger radius of a first curvature and which adjoins a second curved part-face with a smaller radius of a second curvature with a tangential transition at both sides.

4. The chain inner plate for a roller chain, of claim 1:
wherein an inner plate catch chamfer is provided between the round outer contour of the annular region and the annular region on the inner plate inner side;
and wherein the inner plate catch chamfer encloses a chamfer angle of less than 45 degrees with the inner plate inner side of the annular region.

5. The chain inner plate for a roller chain according to claim 4, wherein the chamfer angle is between 36 and 41 degrees.

6. The chain inner plate for a roller chain according to claim 5, wherein the chamfer angle is 38 degrees.

7. The chain inner plate for a roller chain according to claim 5, wherein the outer contour between inner plate catch chamfer and inner plate outer side has an extension in a direction parallel to the centre axis of the hole of 0.3 millimeters.

8. The chain inner plate for a roller chain according to claim 1, wherein the cross-section is taken at a plane which extends transversely through the connection region.

9. A roller chain for a bicycle, comprising:
outer plates, chain pins, chain rollers and chain inner plates, at least one chain inner plate comprising:
an inner side and an outer side;
two ends having annular regions which each have a round outer contour;
a connection region, which connects two annular regions;
and two collars, of which one collar is arranged at the inner side directly adjacent to each of the two annular regions;
wherein the connection region of the inner side has a recess having an inner side material thickness, which is smaller than an annular region material thickness of the annular regions;
and wherein a surface of the recess comprises:
a first curved part-face which adjoins a second curved part-face having at least one tangential transition when viewed in cross-section.

10. The roller chain for a bicycle of claim 9, wherein the chain pins have pin ends which do not protrude with respect to an outer plate outer side.

11. The roller chain for a bicycle of claim 10, wherein the pin ends are formed at least in part by a flat tool which applies a force to the pin end in the direction of the center axis of the chain pin in the direction towards the chain pin, whereby the pin end is shaped so as not to protrude with respect to the outer plate outer side.

* * * * *